(12) United States Patent
Karafillis et al.

(10) Patent No.: US 12,480,417 B2
(45) Date of Patent: Nov. 25, 2025

(54) COLD SPRAY DUCT FOR A GAS TURBINE ENGINE

(71) Applicant: General Electric Company, Schenectady, NY (US)

(72) Inventors: Apostolos Pavlos Karafillis, Winchester, MA (US); Eric Dean Jorgensen, Upton, MA (US); Craig Douglas Young, Blanchester, OH (US); Jonathan Harry Kerner, Brookline, MA (US); Leonardo Ajdelsztajn, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/465,487

(22) Filed: Sep. 12, 2023

(65) Prior Publication Data
US 2023/0417147 A1  Dec. 28, 2023

Related U.S. Application Data

(62) Division of application No. 17/307,394, filed on May 4, 2021, now Pat. No. 11,781,437.

(51) Int. Cl.
| | | |
|---|---|---|
| *F01D 25/24* | (2006.01) | |
| *B05D 1/12* | (2006.01) | |
| *F01D 9/06* | (2006.01) | |

(52) U.S. Cl.
CPC .............. *F01D 9/06* (2013.01); *B05D 1/12* (2013.01); *F01D 25/24* (2013.01); *F05D 2230/31* (2013.01); *F05D 2240/128* (2013.01); *F05D 2260/606* (2013.01)

(58) Field of Classification Search
CPC ... F01D 9/06; F01D 25/24; B05D 1/12; F05D 2230/31; F05D 2240/128; F05D 2260/606; F05D 2240/14; F05D 2250/28; B22F 5/009; B22F 5/04; B22F 10/25; B33Y 80/00; B33Y 10/00; C23C 24/08; C23C 24/04; F02C 7/00
See application file for complete search history.

(56) References Cited

U.S. PATENT DOCUMENTS

| | | |
|---|---|---|
| 3,996,019 A | 12/1976 | Cogan |
| 5,899,660 A | 5/1999 | Dodd |
| 6,179,551 B1 * | 1/2001 | Sathianathan ........ F01D 21/045 415/197 |
| 7,128,948 B2 | 10/2006 | Slattery |

(Continued)

OTHER PUBLICATIONS

Kopecki, Tomasz; Mazurek, Przemyslaw; Lis, Tomasz; "Experimental and Numerical Analysis of a Composite Thin-Walled Cylindrical Structures with Different Variants of Stiffeners, Subjected to Torsion", Oct. 2019, Materials, v. 12. (Year: 2019).*

*Primary Examiner* — Courtney D Heinle
*Assistant Examiner* — Eric A Lange
(74) *Attorney, Agent, or Firm* — Hanley, Flight & Zimmerman, LLC

(57) ABSTRACT

A component for a turbine engine may be formed by spraying particulate with a nozzle toward a substrate. The particulate may be deposited to form one or more annular layers and a reinforcing structure. The component may be a closed loop annular component having a reinforcing structure of specific dimensions enabled by the methods described.

18 Claims, 7 Drawing Sheets

(56) References Cited

U.S. PATENT DOCUMENTS

| | | |
|---|---|---|
| 7,200,933 B2 | 4/2007 | Lundgren et al. |
| 7,381,446 B2 | 6/2008 | Slattery |
| 8,261,444 B2 | 9/2012 | Calla et al. |
| 8,712,634 B2 | 4/2014 | Followell et al. |
| 8,798,817 B2 | 8/2014 | O'Dell et al. |
| 8,942,882 B2 | 1/2015 | Swearingen et al. |
| 9,576,404 B2 | 2/2017 | Ziarno et al. |
| 9,765,435 B2 | 9/2017 | Zahiri et al. |
| 9,963,244 B2 | 5/2018 | Tucker |
| 10,005,129 B2 | 6/2018 | Zahiri et al. |
| 10,023,324 B2 | 7/2018 | Jayathirtha et al. |
| 10,075,228 B2 | 9/2018 | Klippert et al. |
| 10,124,752 B2 | 11/2018 | Boggio |
| 10,465,708 B2 | 11/2019 | Clemen et al. |
| 2005/0003172 A1 | 1/2005 | Wheeler et al. |
| 2006/0172121 A1* | 8/2006 | Lee ................... B29C 70/549 |
| | | 428/178 |
| 2008/0081109 A1 | 4/2008 | Johnson et al. |
| 2012/0100299 A1 | 4/2012 | Zajchowski et al. |
| 2013/0084421 A1 | 4/2013 | Hertter et al. |
| 2014/0023482 A1* | 1/2014 | Wada ................... F01D 11/00 |
| | | 415/110 |
| 2014/0072868 A1 | 3/2014 | Lev |
| 2016/0319666 A1 | 11/2016 | Blumer et al. |
| 2017/0023014 A1* | 1/2017 | Clemen ............... F01D 25/26 |
| 2017/0157671 A1 | 6/2017 | King et al. |
| 2017/0204744 A1* | 7/2017 | Varney ............... F01D 25/246 |
| 2018/0273211 A1 | 9/2018 | Chang et al. |
| 2018/0308297 A1 | 10/2018 | Ciaburri et al. |
| 2019/0010598 A1 | 1/2019 | Scott et al. |

\* cited by examiner

COLD SPRAY DUCT FOR A GAS TURBINE ENGINE

CROSS-REFERENCE TO RELATED APPLICATIONS

The present application is a continuation of and claims priority to U.S. application Ser. No. 17/307,394 entitled "COLD SPRAY DUCT FOR A GAS TURBINE ENGINE", filed May 4, 2021, the entire disclosure of which is hereby expressly incorporated by reference herein.

FEDERALLY SPONSORED RESEARCH

This invention was made with government support under contact number N00421-14-G-0001 awarded by the Department of Defense. The U.S. government may have certain rights in the invention.

FIELD

The present disclosure relates to cold spray manufacturing of ducts for a gas turbine engine.

BACKGROUND

A gas turbine engine generally includes a turbomachine and a rotor assembly. Gas turbine engines, such as turbofan engines, may be used for aircraft propulsion. In a turbofan engine, the rotor assembly may be configured as a fan assembly. The turbomachine may include a spool arrangement. For example, the spool arrangement may include a high pressure, high speed spool and a low pressure, low speed spool. A combustion section of the turbomachine receives pressurized air from a turbomachine flow, which is mixed with fuel and combusted within a combustion chamber to generate combustion gases. The combustion gases are contained by a turbomachine casing and are provided to the spool arrangement. For example, the combustion gases may be provided first to a high pressure turbine of the high pressure spool, driving the high pressure spool, and subsequently to a low speed turbine of the low speed spool, driving the low speed spool.

In a turbofan engine, the fan assembly generally includes a fan and a fan casing. The fan generally includes a plurality of airfoils or fan blades extending radially outwardly from a central hub and/or a disk. Turbofan engines may generally have separation of fluid flow to form the turbomachine flow described above and a bypass flow around the turbomachine. The bypass is generally controlled by a bypass duct which may form at least part of the outer engine case.

Flow control ducts like the bypass duct and turbomachine casing are often subject to high mechanical loads due to its containment of other engine components and stresses such as hoop stress due to the turbomachine flow and bypass flow. Additionally, particularly in low-bypass engines, the bypass duct is subject to high thermal loads. Yet higher can be the thermal loads in turbomachine casings. Known flow control ducts may have relatively heavy construction to manage the required loads. There is a need for an improved flow control duct to effectively manage high mechanical and thermal loads while reducing weight.

BRIEF DESCRIPTION

An object of this disclosure is to describe various flow control duct arrangements to for use in a gas turbine engine. The inventors of the present disclosure have found that given the heavy construction and relatively large nature of the flow control duct, the turbomachine casing can benefit from a reduced weight in the flow control duct.

Engine case components may be constructed using additive manufacturing techniques such as cold spray manufacturing. Using the described techniques, an engine case and components thereof may be constructed with optimized properties include reduced weight, increased stiffness, and/or increased resistance to thermal loads. The described engine case may advantageously provide a resilient and lightweight configuration to contain components and propulsive flow of a gas turbine engine.

One aspect provides a method for forming a closed loop annular component of a turbine engine, the method including spraying, with a nozzle, a first particulate of a first material towards a substrate; spraying, with the nozzle, a second particulate of a second material towards the substrate; maintaining a spray distance and a spray angle between the nozzle and the substrate during spraying; depositing the first particulate on the substrate to form a first annular layer; and selectively depositing the second particulate on the first annular layer to form a reinforcing structure, the reinforcing structure defining a pattern spacing between corresponding deposits less than or equal to 2.5 inches.

Another aspect provides a closed loop annular component for a turbine engine, having a reinforcing structure, the reinforcing structure having a rib structure defining: a rib height; a rib width; and a rib spacing between adjacent ribs, the rib spacing less than or equal to 2.5 inches; a skin defining a skin thickness between adjacent ribs; and a plurality of annular layers, having: a first annular layer; and a second annular layer, wherein the skin thickness is defined at least in part by each of the first and second annular layers.

Yet another aspect provides a method for forming a closed loop annular component of a turbine engine, the method including: spraying, with a nozzle, a first particulate and a second particulate towards a substrate; depositing the first particulate on the substrate to form a skin, the skin defining a skin thickness less than or equal to 0.030 inches; and depositing the second particulate on the skin to form a first reinforcing structure layer having a plurality of ribs, the first reinforcing structure layer defining a rib spacing less than or equal to 2.5 inches between adjacent ones of the plurality of ribs.

BRIEF DESCRIPTION OF THE DRAWINGS

Other aspects and advantages of the embodiments disclosed herein will become apparent upon consideration of the following detailed description, wherein similar or identical structures may have similar or identical reference numerals.

DETAILED DESCRIPTION

Figure 1:
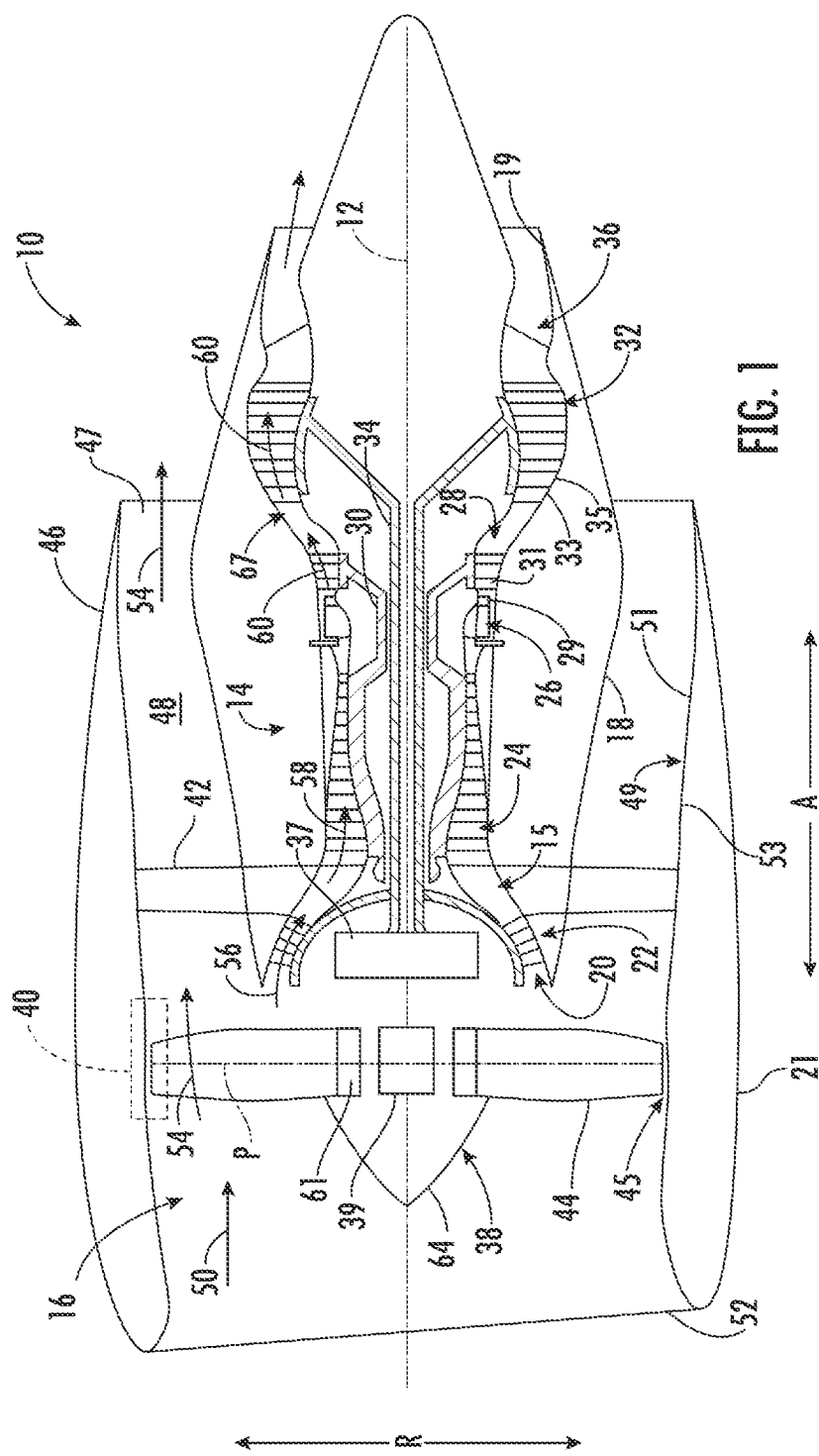
FIG. 1 is a sectional view of a gas turbine engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some embodiments, one or more components of the gas turbine engine described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the production of airfoils, turbine vanes and rotors, compressor vanes and rotors, and/or fan blades. Such components may have unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Cold spray manufacturing may be applied in the construction of various components. Cold spray manufacturing may facilitate construction of larger components than other types of additive manufacturing. A component made using these techniques may be used as a non-functional or functional prototype or may be used in serial production. Cold spray or cold spray additive manufacturing generally accelerates particles from a nozzle in a high velocity fluid stream towards a substrate or backing plate. The particles then impact on the substrate, deforming and bonding with one another to create a layer.

Relative movement of the nozzle across the substrate during this process is used to form a complete layer. This relative movement may be achieved by moving the nozzle and/or the substrate. Layerwise construction can then provide subsequent particles to a first layer in order to form a second layer. Cold spray manufacturing may be used to apply various materials such as pure metals, alloys, metallic glasses, matrix composites, and/or polymers.

After fabrication of a component is complete, various post-processing procedures may be applied to the component. Post processing procedures include removal of the deposited layers from the substrate and removal of excess material by, for example, blowing, vacuuming, and/or blasting. Other post processing procedures include a stress release process. Additionally, thermal and chemical post processing procedures can be used to finish the part. For example, a component may be chemically etched to create a specific surface configuration. Mechanical machining processes may also be employed. A component made using cold spray techniques may be described as a near net component. For example, such a component may require minimal post-processing and/or finish machining to meet the design needs. This near net construction can reduce cost and waste material by limiting post-processing.

Referring now to the Drawings, FIG. 1 is a sectional schematic view of an embodiment of a gas turbine engine 10. The shown embodiment may be used within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure may be equally applicable to turbomachinery in general, such as an open rotor, a turboshaft, turbojet, or a turboprop configuration, including marine and industrial turbine engines and auxiliary power units.

In general, the gas turbine engine 10 includes a turbomachine (indicated generally by reference character 14) and a fan assembly 16 positioned upstream thereof. The turbomachine 14 may include an outer casing 18. The outer casing 18 may be of a substantially tubular configuration and/or may define an annular inlet 20. In addition, the outer casing 18 may further enclose and support a low pressure ("LP") compressor 22 for increasing the pressure of the air that enters the turbomachine 14 to a first pressure level. A high pressure ("HP") compressor may be included. For example, a multi-stage, axial-flow configuration of the HP compressor 24 may receive the pressurized air from the LP compressor 22 and further increase the pressure of such air.

The pressurized air exiting the HP compressor 24 may flow to a combustor 26 within which fuel is injected into the flow of pressurized air, with the resulting mixture being combusted within the combustor 26. Combustion products 60 may be directed from the combustor 26 along a hot gas path 67 of the gas turbine engine 10 to a high pressure ("HP") turbine 28 for driving the HP compressor 24 via a high pressure ("HP") shaft or spool 30. The combustion products 60 may also flow to a low pressure ("LP") turbine 32 for driving the LP compressor 22. The LP turbine 32 may also drive the fan assembly 16. For example, the LP turbine 32 may drive the LP compressor 22 and/or the fan assembly 16 via a low pressure ("LP") shaft or spool 34. The LP shaft 34 may be generally coaxial with the HP shaft 30. After driving the turbines 28 and 32, the combustion products 60 may be expelled from the turbomachine 14 via an exhaust nozzle 36 which may provide propulsive jet thrust.

The turbine sections of the gas turbine engine 10 may include one or more non-rotatable components. For example, the HP turbine 28 may include a plurality of HP turbine stator vanes 29. The LP turbine may include a plurality of LP turbine stator vanes 33. The HP turbine stator vanes 29 and LP turbine stator vanes may be configured to span the hot gas path 67 in the radial direction R. The HP turbine stator vanes 29 and LP turbine stator vanes may be non-rotatable about the longitudinal centerline axis 12 relative to the outer casing 18 and may be used to support the outer casing 18. The HP turbine stator vanes 29 and LP turbine stator vanes 33 may be tuned or tunable to increase the performance of the gas turbine engine 10 by controlling flow speed and pressure.

The turbine sections of the gas turbine engine 10 may include a plurality of rotor blades. For example, the HP turbine 28 may include a plurality of HP turbine rotor blades 31. The LP turbine 32 may include a plurality of LP turbine rotor blades 35. The HP turbine rotor blades 31 and LP turbine rotor blades 35 may be rotatable relative to the outer casing 18. Relative rotation between the HP turbine stator vanes 29 and the HP turbine rotor blades 31 and between the LP turbine stator vanes 33 and the LP turbine rotor blades 35 may be tuned or tunable. For example, pitches of the HP turbine stator vanes 29, HP turbine rotor blades 31, LP turbine stator vanes 33, and/or LP turbine rotor blades may be adjusted or adjustable to optimize flow through the hot gas path 67.

The performance of the gas turbine engine 10 may be increased by minimizing clearances between components such as vanes and blades and ducting components rotatable relative thereto. For example, minimizing and maintaining a clearance between the turbine rotor blades 31, 35 and the outer casing 18 may be used to increase engine performance. Minimizing and maintaining a clearance between the turbine stator vanes 29, 33 and a rotatable component such as the LP shaft or spool 34 or a component coupled thereto may also be used to increase engine performance.

As shown in FIG. 1, the fan assembly 16 of the gas turbine engine 10 may include a fan rotor 38. For example, a rotatable, axial-flow configuration of the fan rotor 38 may configured to rotate in a first circumferential direction P (opposite a second circumferential direction Q) surrounded or ducted by a fan casing 40. In some embodiments, the LP shaft 34 may be connected directly to the fan rotor 38 and/or the rotor disk 61, such as in a direct-drive configuration. In some configurations, the LP shaft 34 may be connected to the fan rotor 38 via a speed reduction device 37 such as a reduction gear gearbox in an indirect-drive or geared-drive configuration. The speed reduction device 37 may be included between any suitable shafts/spools within the gas turbine engine 10 as desired or required. The fan rotor 38 may include a fan shaft extending from the speed reduction device 37 (not labeled) for driving the fan assembly 16.

It should be appreciated by those of ordinary skill in the art that the fan casing 40 may be configured to be supported relative to the turbomachine 14. For example, the fan casing 40 may be supported by a plurality of substantially radially-extending, circumferentially-spaced supports. In an embodiment, a plurality of outlet guide vanes 42 are provided as such supports. As such, the fan casing 40 may enclose the fan rotor 38. The fan casing may include an outer nacelle 21, which may be configured for aerodynamic flight properties such as drag reduction. The fan rotor 38 may be connected to a plurality of fan blades 44. For example, a disk 61 may be provided for coupling to the plurality of fan blades 44. Moreover, a downstream portion 46 of the fan casing 40 may extend over an outer portion of the turbomachine 14 to define an airflow conduit 48. The airflow conduit 48 may be configured as a secondary, or bypass, airflow conduit. The airflow conduit 48 may be configured to provide additional propulsive jet thrust and/or may be used to effect cooling of the gas turbine engine 10, for example using a fan nozzle 47.

The airflow conduit 48 is at least in part constrained by a bypass duct 49. The bypass duct 49 may be attached to or integrated with the fan casing 40. The bypass duct 49 is configured to control airflow within the airflow conduit 48, for example with a bypass duct inner surface 51. The bypass duct 49 may also be referred to as an outer bypass duct. In some embodiments, multiple bypass air flows may be controlled by one or more bypass ducts.

A hub 64 may be provided to cover the disk 61. For example, the hub 64 may be rotatable with the disk 61 and aerodynamically contoured to control airflow through the plurality of fan blades 44.

A pitch change mechanism ("PCM") 39 may be provided. For example, the PCM 39 may be operatively coupled to the plurality of fan blades 44 and configured to vary the pitch of at least some of the fan blades. Individual fan blades 44 may be rotatable relative to the disk 61 about a pitch axis P and controlled by the PCM 39. The PCM 39 may be configured to vary the pitch of fan blades 44 individually or in unison.

It will be appreciated, however, that the gas turbine engine 10 is provided by way of example only. In other exemplary embodiments, the gas turbine engine 10 may have any other suitable configuration. For example, in other exemplary embodiments, the gas turbine engine 10 may include a fixed-pitch fan, may be configured as a direct drive engine (i.e., may not include the gearbox 37), may include any suitable or desired number or configuration of shafts or spools, compressors, and/or turbines, etc.

Referring still to FIG. 1, during operation of the gas turbine engine 10, it should be appreciated that an initial airflow 50 may enter the gas turbine engine 10 through an initial inlet 52 of the fan casing 40. The initial airflow 50 may then pass through the fan blades 44. Downstream of the fan blades 44, the initial airflow 50 may be divided. For example, the initial airflow 50 may be split into a first compressed airflow 54 that moves through the airflow conduit 48 and a second compressed airflow 56 that enters the LP compressor 22. The second compressed airflow 56 may travel along a core air flow path 15 contained by an inner casing 19 of the turbomachine 14. The pressure of the second compressed airflow 56 may then be increased as it enters the HP compressor 24 as a third compressed airflow 58. After mixing with fuel and being combusted within the combustor 26, the combustion products 60 may exit the combustor 26 and flow through the HP turbine 28. Thereafter, the combustion products 60 may flow through the LP turbine 32 and exit the exhaust nozzle 36 to provide thrust for the gas turbine engine 10.

FIG. 1 shows a configuration where the bypass duct inner surface 51 is provided to control the first compressed airflow 54. In this arrangement, the first compressed airflow 54 is constrained between the bypass duct inner surface 51 and the outer casing 18 of the turbomachine 14.

Composite materials may be used in the construction of various components of the gas turbine engine 10. For example, the bypass duct 49 may be at least in part constructed from composite materials. In an embodiment, the bypass duct 49 may include at least one composite ply. For instance, the bypass duct 49 may be formed at least partially from a ceramic matrix composite. More particularly, in certain embodiments, the bypass duct 49 may be formed in part from one or more composite plies configured as ceramic matrix composite prepreg plies.

Composite materials may include, but are not limited to, metal matrix composites (MMCs), polymer matrix composites (PMCs), or ceramic matrix composites (CMCs). Composite materials, such as may be utilized in bypass duct 49, generally include a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Various components may also be constructed of composite or non-composite metallic materials. For example, the bypass duct 49 and/or the inner casing 19 of the turbomachine 14 may be constructed of heat resistant metallic materials. In an embodiment, these components are constructed at least in part of titanium alloy such as Ti-6A1-4V. Such components may also be constructed at least in part of one or more steel alloys. In particularly high heat applications, heat resistant alloys may be used, for example to maintain strength over a wide range of operating temperatures. In an embodiment, nickel alloys such as Inconel 625, 600, and/or 718 may be used to construct one or more of the flow control ducts. In applications where temperatures are relatively low, alloys such as aluminum alloys including 6000, 7000, and/or 8000 series aluminum alloys may be used.

Figure 2:
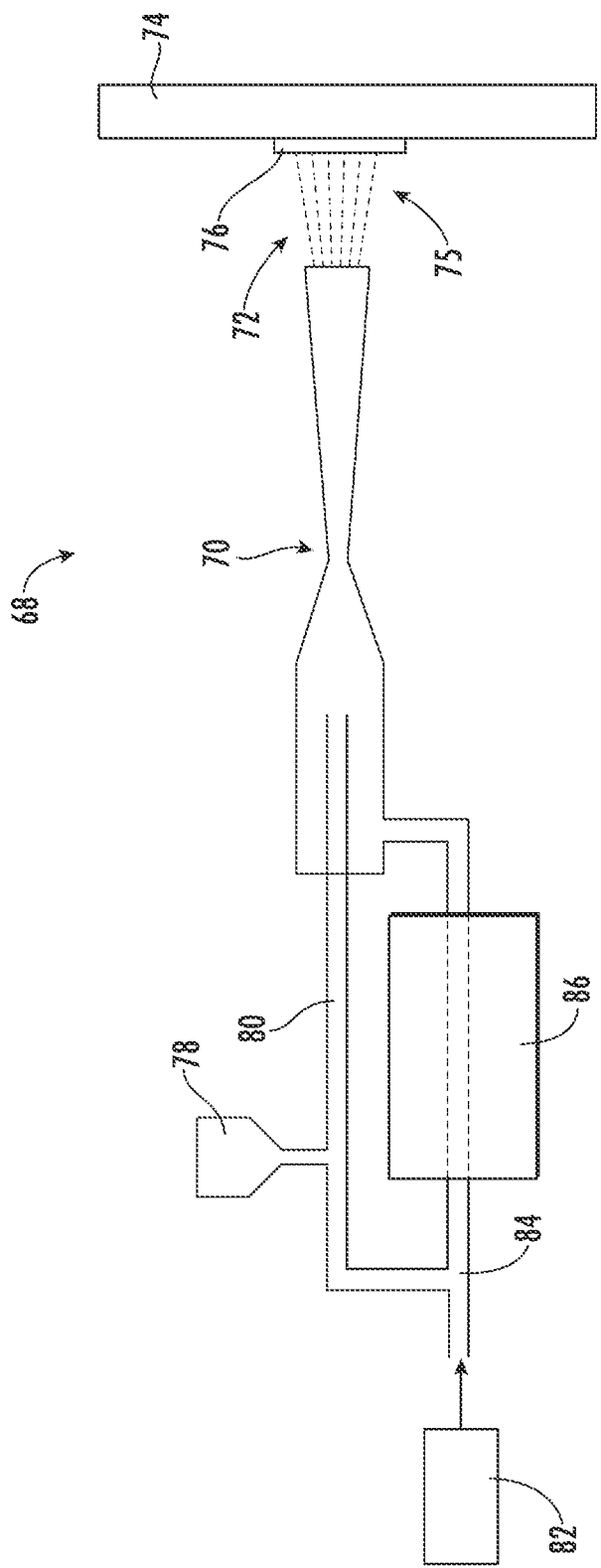
FIG. 2 is a schematic diagram of an embodiment of a cold spray manufacturing arrangement.

Referring to FIG. 2, illustrating a schematic diagram of a cold spray manufacturing arrangement 68, various components of the gas turbine engine 10 may be manufactured using cold spray techniques. The illustrated cold spray manufacturing arrangement 68 uses a nozzle 70 to deposit particles 72 onto a substrate 74 to form a layer 76 on the substrate 74. The substrate 74 as shown has a substantially flat and smooth surface, however other arrangements of substrate may be used such as one having surface features to impart corresponding features to the manufactured component. The depicted embodiment includes a particle feeder 78 configured to supply particles 72 to the nozzle via a particle conduit 80 which may be a tubular component. The particle conduit conducts the particles 72 along a fluid, particularly gas, flow supplied by a pressure source 82. A secondary conduit 84 may be provided to aid deposition. For example, the secondary conduit 84 may diverge from the particle conduit 80 downstream of the pressure source 82. In the depicted embodiment, a heater 86 is provided to aid in the deformation and bonding of the particles 72.

Figure 3:
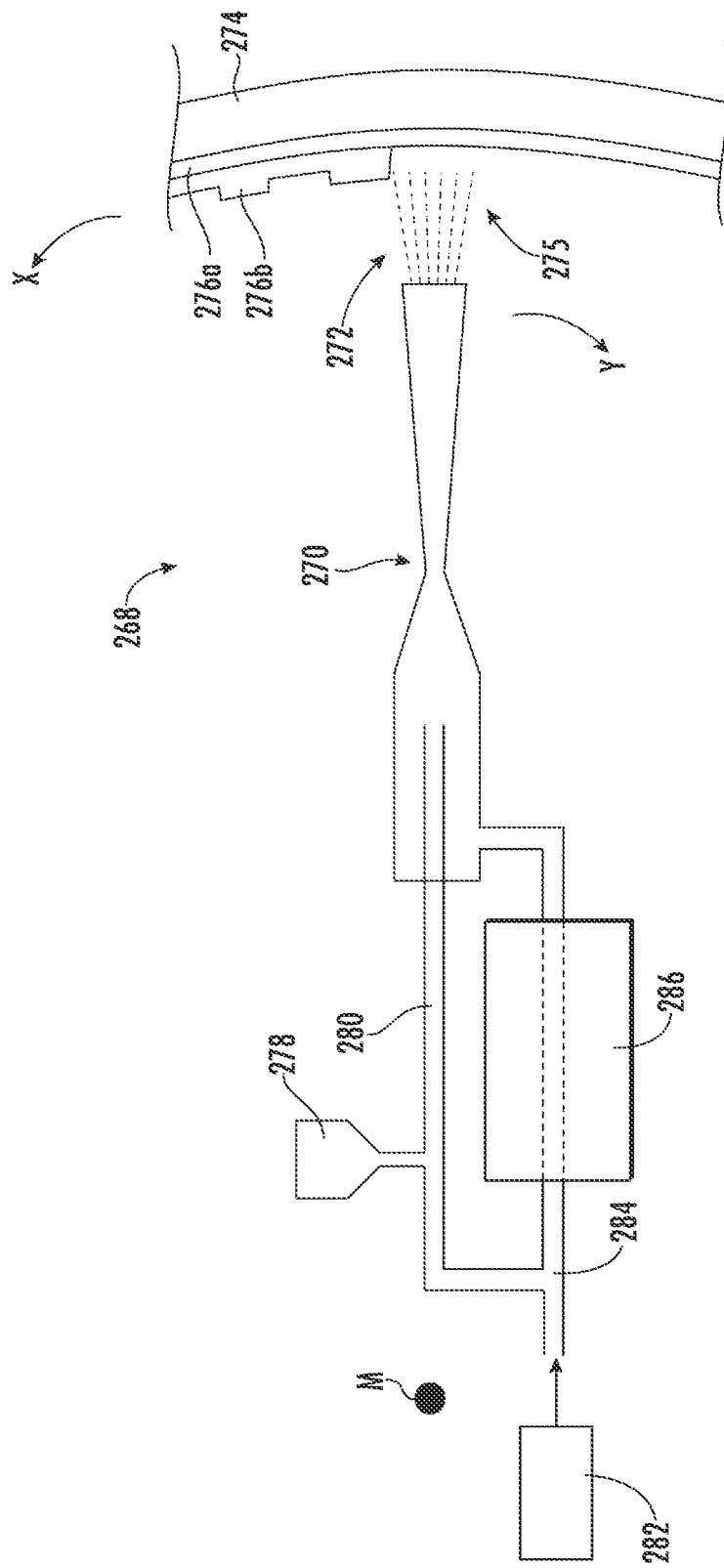
FIG. 3 is a schematic diagram of another embodiment of a cold spray manufacturing arrangement.

Referring to FIG. 3, illustrating a schematic diagram of a cold spray manufacturing arrangement 268 configured for curved component construction, various curved and/or annular components may be manufactured using cold spray techniques. As shown, cold spray techniques such as those described with reference to FIG. 2 can apply subsequent layers of particles 272 to form a component using layerwise construction. As shown, particles 272 of a first particulate may be sprayed on a deposition area 275 of the substrate 274 with the nozzle 270 to form a first layer 276a. Subsequently, particles 272 of a second particulate may be sprayed on the first layer 276a to form a second layer 276b.

The particles 272 of the first and second particulates may be formed of the same material or may include different materials. For example, a heat resistant and/or smooth depositing material may be used to form one or more external layers of a component. The layers 276a, 276b may be of uniform thickness or may differ from one another. Each layer 276a, 276b may also have uniform thickness or may differ in thickness itself. For example, reinforcing structures such as grid-stiffened structures may be employed. In various embodiments, grid-stiffened structures may include stringers, an orthogrid, an x-grid, a waffle grid, a bi-grid, and/or an isogrid may be formed at least in part by varying the thickness of at least one of the layers 276a, 276b.

The arrangement of FIG. 3 depicts a potential method of manufacturing curved and/or annular components. For example, a closed loop annular component may be formed wherein the substrate forms a complete annulus. In the case of an annular substrate 274, deposition of particles 272 may occur from inside the annulus or from outside the annulus. For example, inboard deposition may be performed with a nozzle 270 disposed radially inboard of the substrate 274 and outboard deposition may be performed with a nozzle 270 disposed radially outboard of the substrate relative to a manufacturing axis M as described in the following paragraph. Cold spray manufacturing may benefit from maintaining a substantially orthogonal or perpendicular deposition of particles 272 to the component being manufactured. Such deposition may further be achieved by maintaining a distance and/or angle relationship between the nozzle 270 and an active part of the substrate 274. In one exemplary embodiment, a spray angle defined between the nozzle 270 and a plane of the substrate 274 nearest the nozzle 270 may be held substantially constant during deposition of particles 272, for example within a range of 10 degrees, or within a range of 5 degrees. A spray distance defined between the nozzle 270 and the plane of the substrate 274 nearest the nozzle 270 may be held substantially constant, for example within a range of 10 percent or 5 percent.

The arrangement of FIG. 3 depicts an embodiment of the cold spray manufacturing arrangement 268 where the substrate 274 and/or the nozzle 270 are rotatable about a manufacturing axis M. One of the substrate 274 and the nozzle 270 may be configured to remain stationary while the other is rotatable about the manufacturing axis M. Alternatively, both the nozzle 270 and the substrate 274 may be rotatable. For example, the substrate 274 may be rotatable about the manufacturing axis M in a first rotational direction X and the nozzle 270 may be rotatable about the manufacturing axis M in a second rotational direction Y opposite the first rotational direction X. As shown in FIG. 3, the manufacturing axis M may be disposed such that the nozzle 70 is between the deposition area 275 of the substrate 274 and the manufacturing axis M.

Figure 4:
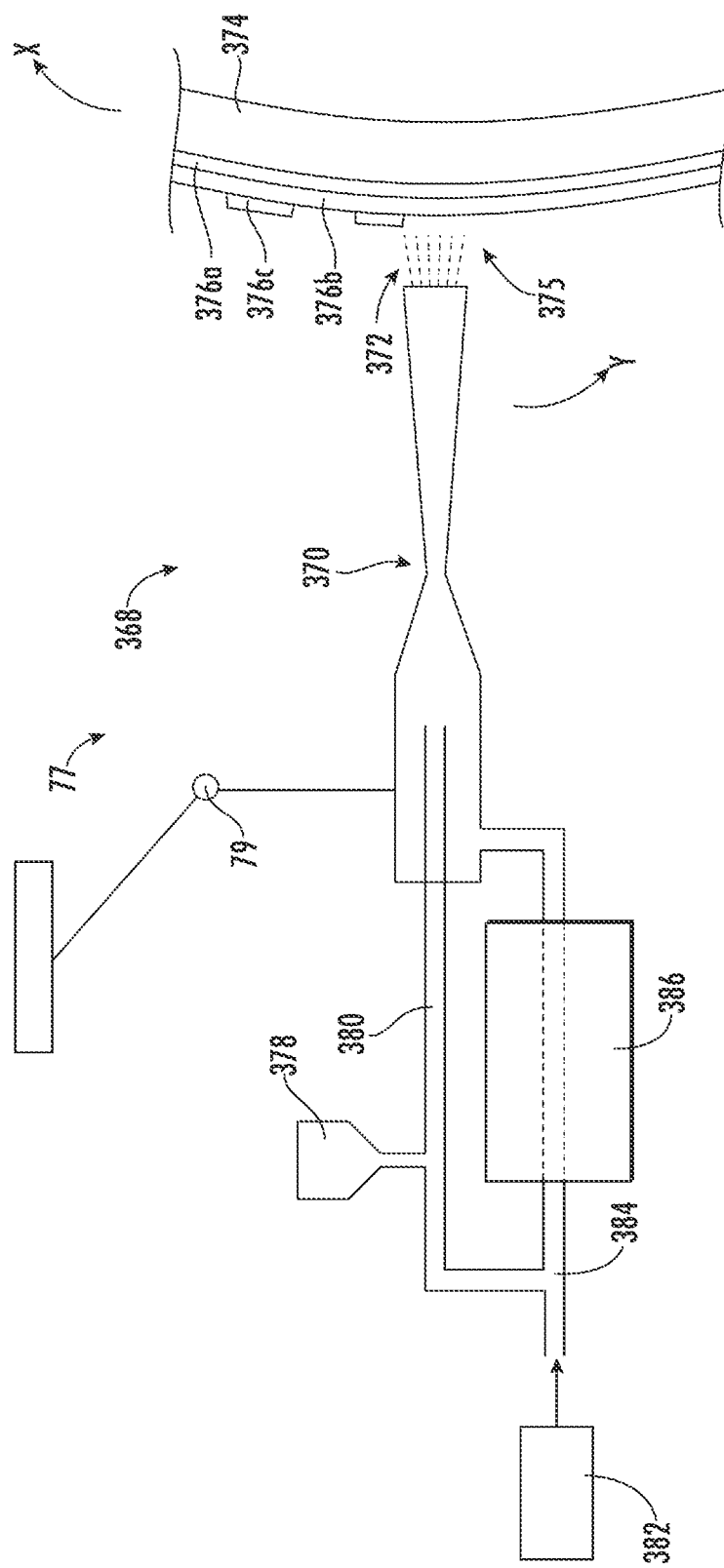
FIG. 4 is a schematic diagram of yet another embodiment of a cold spray manufacturing arrangement.

Referring to FIG. 4, illustrating another schematic diagram of a cold spray manufacturing arrangement 368 configured for curved component construction, various curved and/or annular components may also be manufactured using cold spray techniques. As described above, the layers 376a, 376b may be formed with varying thicknesses relative to each other and themselves. One or more layers 376a, 376b may also be formed intermittently. For example, FIG. 4 depicts a third layer 376c formed intermittently. In various embodiments, selective or intermittent layer construction may be used to form reinforcing structures such as stringers, ribs, and/or isogrid construction.

The manufacturing axis M (not shown in FIG. 4) may also be arranged such that the deposition area 375 of the substrate 374 is disposed between the nozzle 370 and the deposition axis M in a manner in which the nozzle 370 may deposit particles 372 onto the deposition area 375. As in FIG. 3, one or both of the substrate 374 and the nozzle 370 may be rotatable about the manufacturing axis M. In an embodiment, one of the substrate 374 and the nozzle 370 is fixed while the other is rotatable about the manufacturing axis M. In such a manner, the substrate 374 is rotatable about the manufacturing axis M relative to the nozzle 370. In the embodiments of FIG. 3 and FIG. 4, it should also be understood that a second manufacturing axis M may be provided, for example to facilitate manufacturing of non-circular components. Additionally or alternatively, one or both of the nozzle 370 and substrate 374 may be movable about the manufacturing axis M along a curved or angled non-circular path, or may be moved in any other suitable manner.

The nozzle 370 may also be provided on an articulable mount 77 having at least one articulation point 79. The articulable mount 77 may be a robotic arm. In an embodiment, the articulable mount 77 may have at least two degrees of freedom defined at one or more articulation points 79. For example, the articulable mount 77 may have at least three degrees of freedom defined at one or more articulation points 79, such as at least four degrees of freedom defined at one or more articulation points 79, such as at least five degrees of freedom defined at one or more articulation points 79, such as at least six degrees of freedom defined at one or more articulation points 79.

Each articulation point 79 may facilitate relative roll, pitch, and/or yaw between components of the articulable mount 77. The nozzle 370 when provided on the articulable mount 77 may facilitate effective construction of components by controlling the distance and relative angle of the nozzle 370 and the substrate 374 with or without relative rotation about the manufacturing axis M as described above.

The layers 376a, 376b may form complete or intermittent annular layers. For example, the first and second layers 376a, 376b may be formed as complete annular layers. A third layer 376c may be formed as an intermittent annular layer. Subsequent intermittent layers may be formed on the third layer 376c, for example to form an isogrid structure, where each may be referred to as a reinforcing structure layer. Each of the layers 376a, 376b may define part or all of a reinforcing structure and/or part or all of a skin, as described below.

As above, the layers 376a, 376b, 376c may be formed from different materials. For example, a relatively stiff layer of a first material having a relatively high Young's modulus may be deposited onto a relatively flexible layer of a second material having a relatively low Young's modulus or vice versa. Thermal properties of the layers may also vary. For example, the first layer 376a may be formed of a first material having a greater coefficient of thermal expansion than the second layer 376b or vice versa. In an embodiment, one of the first layer 376a and second layer 376b may be constructed from a first material having a relatively high Young's modulus and the other of the first layer 376a and second layer 376b may be constructed from a second material having a relatively low Young's modulus, where both the first and second materials have substantially similar coefficients of thermal expansion. As used herein, the term "substantially similar" with respect to the two coefficients of thermal expansion refers to the first coefficient of thermal expansion being substantially the same as the second coefficient of thermal expansion, according to the definition of "substantially" provided above. Such an arrangement may facilitate resilience and longevity of the component by limiting relative expansion or contraction between layers during use of the component while taking advantage of the different material properties in the component. In a further embodiment, the first and third layers 376a, 376c may each have a relatively high Young's modulus while the second layer 376b disposed therebetween has a relatively low Young's modulus. In this and other embodiments, all layers 376a, 376b, 376c may have substantially similar coefficients of thermal expansion.

It will be appreciated that the terms "relatively high" and "relatively low" are meant to differentiate two values from one another and do not require or imply any threshold value.

Figure 5:
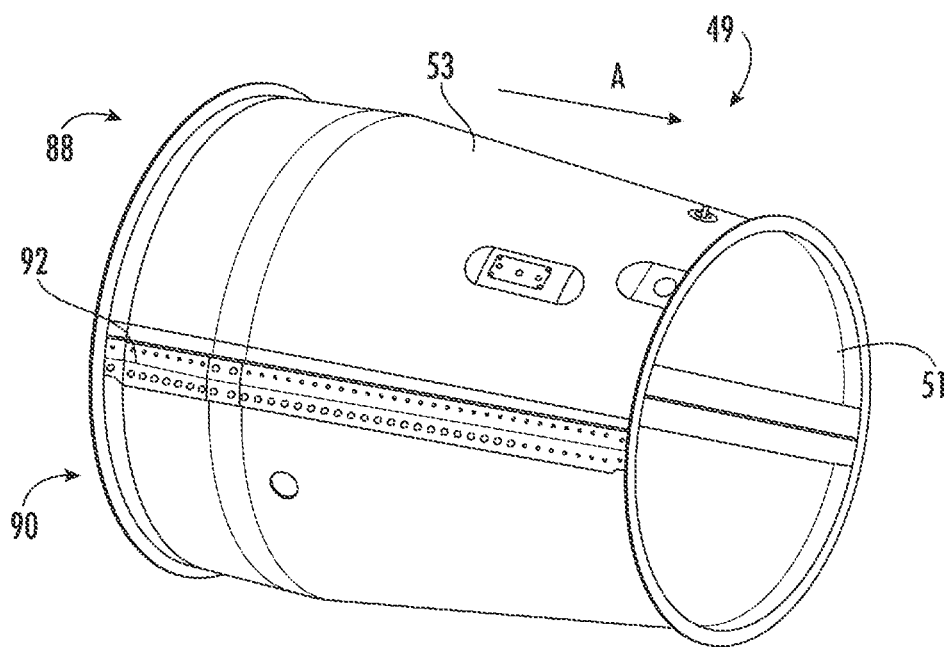
FIG. 5 is an embodiment of a bypass duct which may be constructed using conventional or cold spray manufacturing techniques.

Referring to FIG. 5, an embodiment of a bypass duct 49 in accordance with an embodiment of the present disclosure is provided. The bypass duct 49 may be configured in a similar manner as one or more of the bypass ducts 49 described above. For example, the exemplary embodiment of the bypass duct 49 depicted has a bypass duct inner surface 51 and a bypass duct outer surface 53. The bypass duct 49 of FIG. 5 may be constructed using conventional methods or using cold spray manufacturing techniques for example as described with reference to FIGS. 2-4. The bypass duct 49 may be a unitary construction or may be made of separately manufactured portions. The bypass duct 49 depicted has a first bypass duct portion 88 and a second bypass duct portion 90 attachable at a bypass duct connection 92. The bypass duct connection 92 may be a removable connection using fasteners or may be a permanent or semi-permanent connection, for example using adhesives, bonding, and/or welding. Such a bypass duct 49 made of a plurality of portions may facilitate construction using various methods and/or may facilitate access for assembly and/or service of the gas turbine engine 10.

Figure 6:
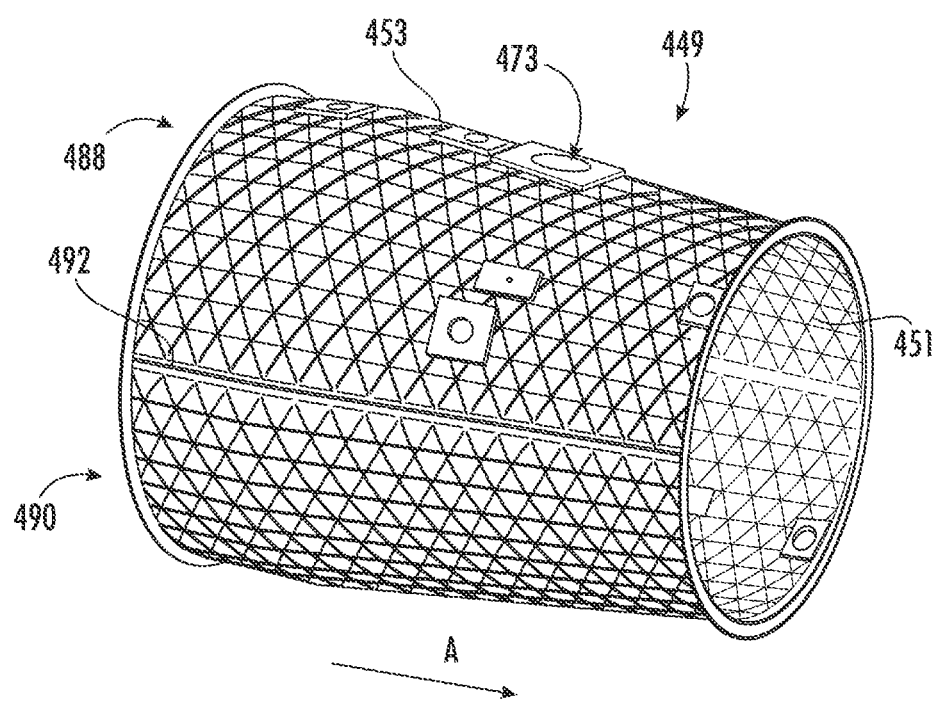
FIG. 6 is an embodiment of a bypass duct which may be constructed using cold spray manufacturing techniques.

Referring now to FIG. 6, another embodiment of a bypass duct 449 in accordance with another embodiment of the present disclosure is provided. The bypass duct 449 may be configured in a similar manner as one or more of the bypass ducts 449 described above. For example, the exemplary embodiment of the bypass duct 449 depicted has a bypass duct inner surface 451 and a bypass duct outer surface 453. The embodiment of FIG. 6 may be constructed using cold spray manufacturing techniques, such as through one or more techniques using an embodiment of the cold spray manufacturing arrangements 68, 268, 368 described above with reference to FIGS. 2-4. These techniques enable advancements in performance including increased panel bending stiffness, increased buckling resistance, and reduced weight as described in further detail with reference to FIGS. 7-12 below. As depicted, the bypass duct 449 has a reinforcing structure on the bypass duct inner surface 451 and the bypass duct outer surface 453. As used herein, the term "reinforcing structure" generally describes surface features protruding from a surface of a component such as the bypass duct 449. A reinforcing structure may be tuned in size and shape to meet the needs of an application. For example, a repeating geometric pattern may be provided in the form of a grid such as an orthogrid, bi-grid, x-grid, or isogrid.

More specifically, FIG. 6 provides an isogrid reinforcing structure that extends substantially completely across the bypass duct inner surface 451 and substantially completely across the bypass duct outer surface 453. It should be appreciated that this structure may be provided on only one of the bypass duct inner and outer surfaces 451, 453, may be provided intermittently on a surface, or may be omitted altogether. Although the bypass duct 449 is shown as having a first bypass duct portion 488 and a second bypass duct portion 490 with a bypass duct connection 492 disposed therebetween, it should be appreciated that the bypass duct 449 may be manufactured as a single piece and/or without a bypass duct connection 492. Alternatively, the bypass duct 449 may be constructed with more than two bypass duct portions attachable with a plurality of connections.

Figure 7:
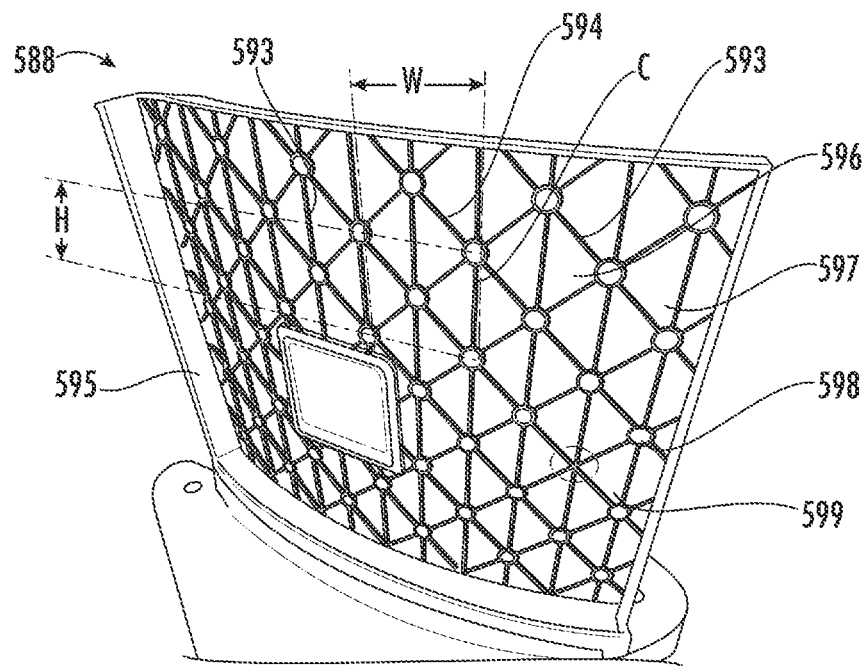
FIG. 7 is a portion of a bypass duct which may be constructed using cold spray manufacturing techniques.

Referring to FIG. 7, which depicts a bypass duct portion 588 which may be constructed using cold spray manufacturing techniques and incorporated into or form a part of one or more of the bypass ducts described above, a reinforcing grid of an isogrid configuration can be seen in greater detail. The reinforcing grid may have a repeating pattern defined by a unit cell C. As shown in FIG. 7, the unit cell C has a unit cell first dimension H and a unit cell second dimension W, which may correspond to height and width dimensions respectively. The unit cell first and second dimensions H, W may be equal, substantially equal, or different. For example, the unit cell first dimension H may be twice the unit cell second dimension W.

Each unit cell C includes at least one rib to form the reinforcing grid. A rib structure may be provided to form at least part of the reinforcing grid or structure. For example, ribs may be formed in various geometric arrangements such as orthogrid, x-grid, bi-grid, and/or isogrid configurations. FIG. 7 depicts an arrangement having a first rib 593 repeating in the pattern and a second rib 594 repeating in the pattern, where the first rib 593 is longer than the second rib 594. As shown, the first rib 593 may describe the hypotenuse of a right triangle while the second rib 594 may describe adjacent legs of a right triangle.

One or more openings between the ribs 593, 594 are provided in each unit cell C. As shown, a first opening 596 and a second opening 597 may be provided between the ribs 594, 594. The first and second openings 596, 597 as shown may be opposing right triangles forming a square separated by the first rib 593. It should be appreciated that the openings 596, 597 can be configured with various geometries corresponding to geometries of the ribs 593, 594. For example, a third opening 598 may be provided at the junction of one or more of the ribs 593, 594. In an embodiment, the third opening 598 is provided at each junction of the ribs 593, 594. The third opening 598 may be circular or of any other suitable geometry and may be configured to be substantially smaller than either of the first and second openings 596, 597.

The bypass duct portion 588 as shown includes a skin 599. The skin 599 may define a base thickness of the bypass duct portion. The base thickness of the skin 599 may be maintained in the openings and may be built upon at the ribs 593, 594. The "skin" may generally refer to a base of a component such as the bypass duct portion 588. For example, the skin 599 may define the general size and shape of the bypass duct portion 588 onto which various surface features such as a reinforcing structure may be added. The skin 599 may be intermittent, for example providing openings. In an embodiment, the skin 599 has one or more openings (for example opening 473) in FIG. 6). Openings 473 may be provided to combine or cross over different bypass flows such as the first compressed airflow 54 and/or to tap off such flows for providing power or flow for other functions of the gas turbine engine 10 and/or an aircraft in which it is installed.

An end band 595 may also be provided. The end band 595 may be constructed similarly to the ribs 593, 594 and may be configured for joining adjacent bypass duct portions 588. For example, opposing end bands 595 may be provided on the adjacent first and second bypass duct portions 88, 90 to provide reinforcement to the bypass duct connection 92 as shown in FIG. 6.

Figure 8:
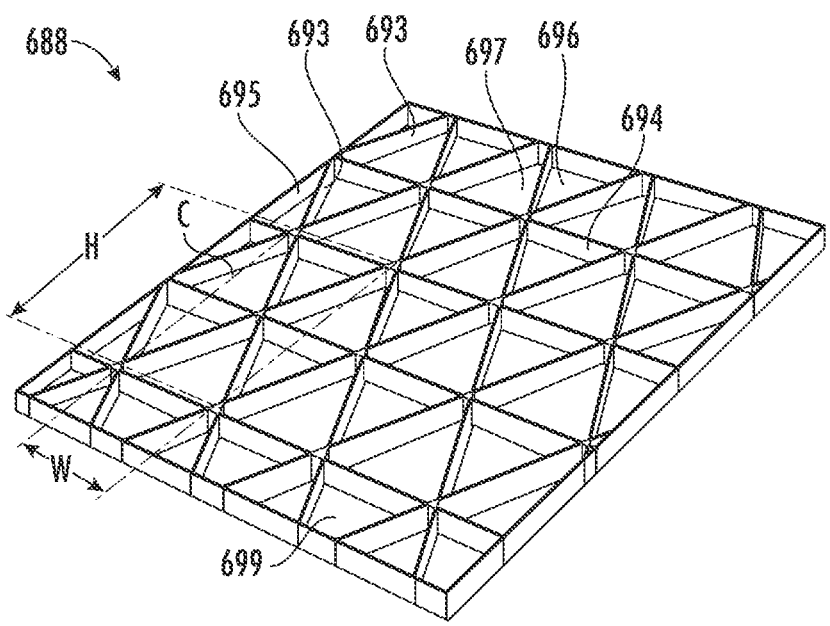
FIG. 8 is a schematic representation of a portion of a bypass duct which may be constructed using cold spray manufacturing techniques.

Referring to FIG. 8, which depicts a schematic representation of a bypass duct portion 688 which may be constructed using cold spray manufacturing techniques and incorporated into or form a part of one or more of the bypass ducts described above, an isogrid pattern can be seen in more detail. The embodiment of FIG. 8 differs from that of FIG. 7 at least in that a non-right isosceles triangle is depicted. In this embodiment, a first rib 693 is provided opposite another first rib 693 of equal length, with a second rib 694 provided to complete an isosceles triangle. While the first rib 693 is depicted as longer than the second rib 694 to form an acute triangle, it should be understood that the first rib 693 may also be shorter than the second rib 694 to form an obtuse triangle. A first opening 696 and a second opening 697 are depicted as defining adjacent and inverted isosceles triangles defined in the skin 699 between the ribs 693, 694. As in the embodiment of FIG. 7, one or more end bands 695 may be provided.

Figure 9:
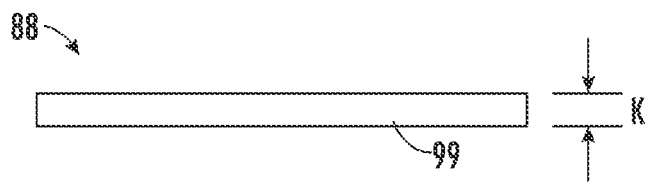
FIG. 9 is a cross-sectional schematic view of a bypass duct which may be constructed using conventional or cold spray manufacturing techniques.

Referring to FIG. 9, which depicts a cross-sectional schematic view of a bypass duct which may be constructed using conventional or cold spray manufacturing techniques and incorporated into or form a part of one or more of the bypass ducts described above, the skin 99 is shown as having a skin thickness K. The skin thickness K may be tunable to achieve properties such as mechanical strength, heat resistance, and/or weight.

Figure 10:
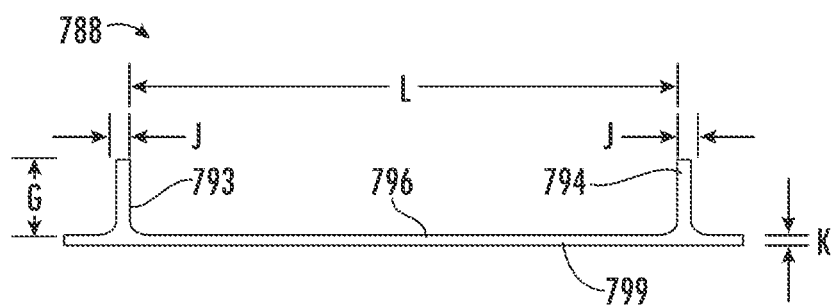
FIG. 10 is a cross-sectional schematic view of an embodiment of a bypass duct which may be constructed using cold spray manufacturing techniques.

Referring to FIG. 10, which depicts a cross-sectional schematic view of an embodiment of a bypass duct portion 788 which may be constructed using cold spray manufacturing techniques and incorporated into or form a part of one or more of the bypass ducts described above, a skin 799 is shown as having a first rib 793 and a second rib 794 disposed thereon. As depicted, an opening 796 may be defined between the first and second ribs 793, 794. The opening 796 may have a length defined by a pattern spacing L. The pattern spacing L represents the maximum distance between first and second ribs 793, 794 in the unit cell C as shown in FIGS. 7 and 8. More generally, the pattern spacing L may be defined as a distance between adjacent ribs, for example adjacent parallel ribs. The ribs 793, 794 define a rib height G extending orthogonally from the skin 799 and a rib thickness J perpendicular to the direction of the rib height G. A total thickness may be defined by adding the rib thickness G to the skin thickness K. The embodiment of FIG. 10 may represent a component manufactured from a titanium alloy casting and then machined.

As above, the skin thickness K may be tunable to achieve desired properties. In various embodiments, the skin thickness may be in a range from 0.050 inches to 0.012 inches. For example, the skin thickness K may be 0.035, 0.032, 0.030 inches. In some embodiments, particularly where rib height G is maximized and/or where a major dimension or pattern spacing L of the unit cell C is minimized to create a dense pattern, the skin thickness K may be less than 0.030 inches. For example, the skin thickness may be 0.0270 inches or 0.0250 inches.

The rib width J may also be tunable to achieve desired properties. In various embodiments, the rib width J is in a range from 0.012 to 0.040 inches. In some embodiments, particularly where rib height G is maximized and/or where a major dimension or pattern spacing L of the unit cell C is minimized to create a dense pattern, the rib width J may be less than or equal to 0.025 inches, for example 0.020 or 0.015 inches. The rib width J may be tuned such that the skin thickness K is greater than or equal to the rib width J.

Figure 11:
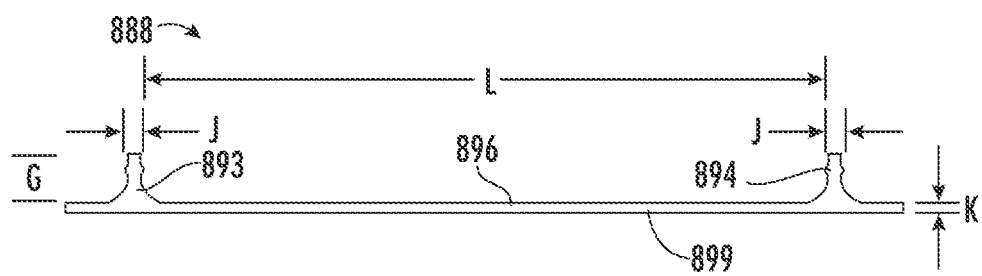
FIG. 11 is a cross-sectional schematic view of another embodiment of a bypass duct which may be constructed using cold spray manufacturing techniques.

Referring to FIG. 11, which depicts a cross-sectional schematic view of another embodiment of a bypass duct portion 888 which may be constructed using cold spray manufacturing techniques and incorporated into or form a part of one or more of the bypass ducts described above, a skin 899 is shown as having a first rib 893 and a second rib 894 disposed thereon. As depicted, an opening 896 may be defined between the first and second ribs 893, 894. FIG. 11 differs from previous embodiments at least in that a relatively short rib height G is provided. Also as shown, a relatively large pattern spacing L is also provided in the embodiment of FIG. 11. The embodiment of FIG. 11 may represent a component manufactured out of a titanium alloy that is fabricated and then chem milled.

The pattern spacing L may also be tunable to achieve desired properties. In various embodiments, the pattern spacing L may be between 1 and 2.5 inches. For example, the pattern spacing L may be 1.500, 1.750, 2.000, or 2.250 inches. Minimizing the pattern spacing L as well as the skin thickness K and rib thickness J may facilitate construction of a lightweight and strong component. These reduced dimensions may be made efficiently and cost-effectively using the cold spray manufacturing techniques described herein to create large format components to near net dimensions, thus reducing post-processing time and expense.

Figure 12:
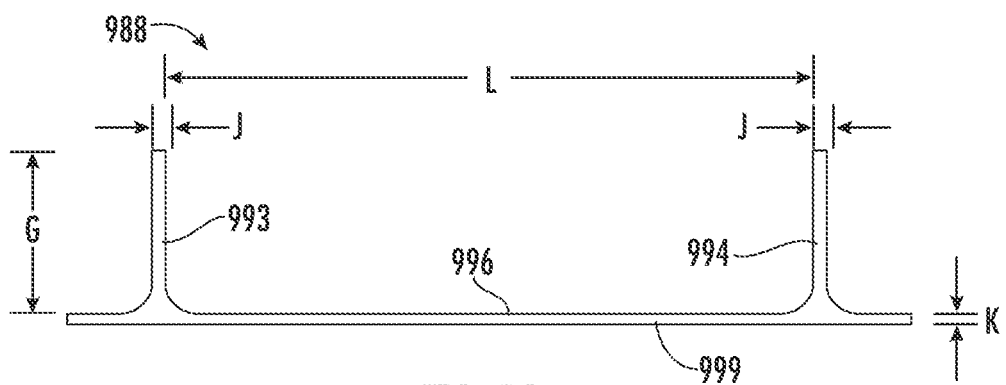
FIG. 12 is a cross-sectional schematic view of yet another embodiment of a bypass duct which may be constructed using cold spray manufacturing techniques.

Referring to FIG. 12, which depicts a cross-sectional schematic view of yet another embodiment of a bypass duct portion 988 which may be constructed using cold spray manufacturing techniques and incorporated into or form a part of one or more of the bypass ducts described above, a skin 999 is shown as having a first rib 993 and a second rib 994 disposed thereon. As depicted, an opening 996 may be defined between the first and second ribs 993, 994. FIG. 12 differs from previous embodiments at least in that a relatively tall rib height G is provided. Also as shown, a relatively large pattern spacing L is also provided in the embodiment of FIG. 12. The embodiment of FIG. 12 may represent a component manufactured to near net proportions using cold spray manufacturing techniques. Such a component may benefit from a relatively tall rib height G compared to those used with conventional machining, milling, or etching techniques as less time and expense must be undertaken to remove material and arrive at a finished component. In various embodiments, the rib height G may be greater than one inch. For example, the rib height K may be 1.250 inches, 1.500 inches, 1.750 inches, or 2.000 inches.

A variable sized reinforcing grid may also be provided in the same component using various dimensions described with reference to FIGS. 9-12. Additionally or alternatively, different geometries of reinforcing grids such as those in FIGS. 7 and 8 may be provided in the same component. Such tunability is feasible due to the cold spray manufacturing techniques described herein.

Multiple layers of construction may be included in various features of a reinforcing grid as described. For example, the first layer 276a and the second layer 276b as described with reference to FIG. 3 may each define part of the rib width J, the rib height, G, and the skin thickness K.

The components as described may be provided with any of the features and elements as shown and described. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Further aspects are provided by the subject matter of the following clauses:

One aspect provides a method for forming a closed loop annular component of a turbine engine, the method including spraying, with a nozzle, a first particulate of a first material towards a substrate; spraying, with the nozzle, a second particulate of a second material towards the substrate; maintaining a spray distance and a spray angle between the nozzle and the substrate during spraying; depositing the first particulate on the substrate to form a first annular layer; and selectively depositing the second particulate on the first annular layer to form a reinforcing structure, the reinforcing structure defining a pattern spacing between corresponding deposits less than or equal to 2.5 inches.

In one aspect, the first material and the second material are the same.

In another aspect, at least one of the substrate or the nozzle are rotatable about an axis.

In another aspect, the first particulate is deposited radially inboard of the substrate relative to the axis.

In another aspect, the first particulate is deposited radially outboard of the substrate relative to the axis.

In another aspect, the reinforcing structure comprises an isogrid pattern, the isogrid pattern comprising: a rib structure defining a rib height and a rib width; and a skin between adjacent ribs of the rib structure, the skin defining a skin thickness.

In another aspect, the skin thickness is less than 0.030 inches and the rib width is less than 0.040 inches.

In another aspect, the skin thickness is greater than or equal to the rib width.

In another aspect, the skin thickness is less than or equal to 0.027 inches and the rib width is less than or equal to 0.025 inches.

In another aspect, the pattern spacing is less than or equal to 2.0 inches.

In another aspect, the pattern spacing is less than or equal to 1.5 inches.

Another aspect provides a closed loop annular component for a turbine engine, having a reinforcing structure, the reinforcing structure having a rib structure defining: a rib height; a rib width; and a rib spacing between adjacent ribs, the rib spacing less than or equal to 2.5 inches; a skin defining a skin thickness between adjacent ribs; and a plurality of annular layers, having: a first annular layer; and a second annular layer, wherein the skin thickness is defined at least in part by each of the first and second annular layers.

In another aspect, the first annular layer and the second annular layer are formed of the same material.

In another aspect, the rib width is defined at least in part by each of the first and second annular layers.

In another aspect, the skin thickness is less than 0.030 inches and the rib width is less than 0.040 inches.

In another aspect, the first annular layer defines more of the skin thickness than the second annular layer.

In another aspect, the skin thickness is less than or equal to 0.025 inches and the rib width is less than or equal to 0.020 inches.

In another aspect, the skin thickness is greater than or equal to the rib width.

In another aspect, the reinforcing structure comprises an isogrid pattern.

Another aspect provides a method for forming a closed loop annular component of a turbine engine, the method including: spraying, with a nozzle, a first particulate and a second particulate towards a substrate; depositing the first particulate on the substrate to form a skin, the skin defining a skin thickness less than or equal to 0.030 inches; and depositing the second particulate on the skin to form a first reinforcing structure layer having a plurality of ribs, the first reinforcing structure layer defining a rib spacing less than or equal to 2.5 inches between adjacent ones of the plurality of ribs.

Another aspect provides A method for forming an annular component of a turbine engine, the method including: spraying, with a nozzle, a first particulate of a first material towards a substrate; spraying, with the nozzle, a second particulate of a second material different from the first material towards the substrate; rotating at least one of the substrate or the nozzle about an axis; depositing the first particulate on the substrate to form a first annular layer; and; depositing the second particulate on the first annular layer to form a second annular layer.

In another aspect, the method includes depositing the first particulate on the second annular layer to form a third annular layer.

In another aspect, the first material has a first Young's modulus and the second material has a second Young's modulus, wherein the first Young's modulus is greater than the second Young's modulus.

In another aspect, the first material and the second material have substantially similar coefficients of thermal expansion.

In another aspect, the at least one annular layer further comprises a third annular layer, the third annular layer comprising a third material having a third Young's modulus greater than the second Young's modulus and disposed radially outward of the second annular layer and further radially outward of the first annular layer.

In another aspect, the at least one annular layer comprises an isogrid pattern, the isogrid pattern comprising: a rib structure defining a rib height and a rib width; and a skin defining a skin thickness.

In another aspect, the skin thickness is less than 0.030 inches and the rib width is less than 0.040 inches.

In another aspect, the skin thickness is greater than or equal to the rib width.

In another aspect, the skin thickness is less than or equal to 0.027 inches and the rib width is less than or equal to 0.025 inches.

In another aspect, the rib structure further defines a pattern spacing between a first rib and a second rib, the pattern spacing being less than or equal to 2.0 inches.

In another aspect, the pattern spacing is less than or equal to 1.5 inches.

Another aspect provides component for a turbine engine, the component having: a reinforcing structure, comprising: a rib structure defining a rib height and a rib width; and a skin defining a skin thickness; and a plurality of annular layers, comprising: a first annular layer; and a second annular layer, wherein the skin thickness is defined at least in part by each of the first and second annular layers.

In another aspect, the first annular layer comprises a first material having a first Young's modulus and the second annular layer comprises a second material having a second Young's modulus, wherein the first Young's modulus is greater than the second Young's modulus.

In another aspect, the rib width is defined at least in part by each of the first and second annular layers.

In another aspect, the plurality of annular layers further comprises a third annular layer, the third annular layer comprising a third material having a third Young's modulus greater than the second Young's modulus and disposed radially outward of the second annular layer and further radially outward of the first annular layer.

In another aspect, the second annular layer defines more of the skin thickness than either of the first and third annular layers.

In another aspect, the skin thickness is less than or equal to 0.025 inches and the rib width is less than or equal to 0.020 inches.

In another aspect, the skin thickness is greater than or equal to the rib width.

In another aspect, the reinforcing structure comprises an isogrid pattern.

Another aspect provides a method for forming a component of a turbine engine, the method including: spraying, with a nozzle, a first particulate and a second particulate towards a substrate; depositing the first particulate on the substrate to form a first isogrid layer; and depositing the second particulate on the first isogrid layer to form a second isogrid layer.

We claim:

1. A closed loop annular component for a turbine engine, comprising:
    a reinforcing structure having a triangular grid pattern, comprising:
        a rib structure defining:
            a rib height;
            a rib width; and
            a rib spacing between adjacent ribs, the rib spacing less than or equal to 2.5 inches;
        a skin defining a skin thickness between adjacent ribs, wherein the skin thickness is less than 0.030 inches and the rib width is less than 0.040 inches; and
    a plurality of annular layers, comprising:
        a first annular layer; and
        a second annular layer, wherein the skin thickness is defined at least in part by each of the first and second annular layers.

2. The closed loop annular component of claim 1, wherein the first annular layer and the second annular layer are formed of the same material.

3. The closed loop annular component of claim 1, wherein the rib width is defined at least in part by each of the first and second annular layers.

4. The closed loop annular component of claim 1, wherein the first annular layer defines more of the skin thickness than the second annular layer.

5. The closed loop annular component of claim 1, wherein the skin thickness is less than or equal to 0.025 inches and the rib width is less than or equal to 0.020 inches.

6. The closed loop annular component of claim 1, wherein the skin thickness is greater than or equal to the rib width.

7. The closed loop annular component of claim 1, wherein the reinforcing structure comprises an isogrid pattern.

8. The closed loop annular component of claim 1, wherein the reinforcing structure comprises an orthogrid pattern.

9. The closed loop annular component of claim 1, wherein the reinforcing structure comprises a bi-grid pattern.

10. A component for a turbine engine, comprising:
    a reinforcing structure having a triangular grid pattern, comprising:
        a rib structure defining:
            a rib height;
            a rib width; and
            a rib spacing between adjacent ribs;
        a skin defining a skin thickness between adjacent ribs, wherein the skin thickness is less than 0.030 inches and the rib width is less than 0.040 inches; and
    a plurality of annular layers, comprising:
        a first annular layer; and
        a second annular layer, wherein the skin thickness is defined at least in part by each of the first and second annular layers.

11. The component of claim 10, wherein the first annular layer and the second annular layer are formed of the same material.

12. The component of claim 10, wherein the rib width is defined at least in part by each of the first and second annular layers.

13. The component of claim 10, wherein the first annular layer defines more of the skin thickness than the second annular layer.

14. The component of claim 10, wherein the skin thickness is less than or equal to 0.025 inches and the rib width is less than or equal to 0.020 inches.

15. The component of claim 10, wherein the skin thickness is greater than or equal to the rib width.

16. The component of claim 10, wherein the reinforcing structure comprises an isogrid pattern.

17. The component of claim 10, wherein the reinforcing structure comprises an orthogrid pattern.

18. The component of claim 10, wherein the reinforcing structure comprises a bi-grid pattern.

* * * * *